United States Patent [19]

Levine

[11] Patent Number: 4,646,142
[45] Date of Patent: Feb. 24, 1987

[54] METHOD AND APPARATUS FOR ALIGNING SOLID-STATE IMAGERS

[75] Inventor: Peter A. Levine, Trenton, N.J.
[73] Assignee: RCA Corporation, Princeton, N.J.
[21] Appl. No.: 654,557
[22] Filed: Sep. 26, 1984
[51] Int. Cl.[4] .......................... H04N 9/09; H04N 904
[52] U.S. Cl. ......................................... 358/50; 358/51; 358/55; 357/24; 250/239; 250/491.1; 356/363; 356/401; 356/435
[58] Field of Search ..................... 358/50, 51, 55, 213; 356/363, 375, 399, 400, 401, 435; 250/491.1, 239; 357/24

[56] References Cited

U.S. PATENT DOCUMENTS

| | | | |
|---|---|---|---|
| 4,211,489 | 7/1980 | Kleinknecht et al. | 356/400 |
| 4,323,918 | 4/1982 | Bendell | 358/50 |
| 4,388,128 | 6/1983 | Ogawa et al. | 156/64 |
| 4,422,763 | 12/1983 | Kleinknecht | 356/356 |

*Primary Examiner*—James J. Groody
*Assistant Examiner*—John K. Peng
*Attorney, Agent, or Firm*—Eugene M. Whitacre; Peter M. Emanuel; James B. Hayes

[57] ABSTRACT

Alignment of a plurality of thinned substrate solid-state imagers mounted at the outputs of an optical assembly is accomplished optically, without the necessity to electrically operate the imagers. Light blocking alignment indicia, such as a chevron pattern, are deposited over the electrode structure of the chip. When the imagers are positioned at the optical assembly outputs and light is used to illuminate the imagers electrode structure side, the alignment indicia are visible at the optical assembly input and can be used for alignment of the imagers.

19 Claims, 8 Drawing Figures

METHOD AND APPARATUS FOR ALIGNING SOLID-STATE IMAGERS

BACKGROUND OF THE INVENTION

The present invention relates to a method and apparatus for optically aligning solid-state imagers.

When a plurality of solid-state imagers are optically arranged to view the same image and each imager is to supply an electrical signal which is a component part of the image, it is necessary that the photosensitive imagers. For example, in a color video camera, a color light-splitting prism can split the light reflected from a scene into its red (R), green (G) and blue (B) components. A solid-state imager can be positioned at a respective exit port of the prism for receiving a component color image of the scene and supplying a corresponding electrical signal. In order to properly reproduce the image in full color, it is necessary that the R, G, and B component electrical signals represent color components which spatially coincide with each other. That is, each of the solid-state imagers must be precisely registered with one another such that their respective electrical signals simultaneously refer to the same portion of the image.

In the prior art, such as U.S. Pat. No. 4,323,918 entitled OPTICAL ASSEMBLY FOR COLOR TELEVISION, issued Apr. 6, 1982 to Bendell, the individual solid-state imagers (each imager including a solid-state imaging chip housed in a ceramic insulating integrated circuit (IC) package are positioned at the respective prism exit ports using an adhesive which does not cure or harden until exposed to a given amount of ultraviolet (UV) light. Next, electrical connection is made to each imager and operating signals are applied in order that the imagers are operating correctly. The component color electrical signals from each imager are then simultaneously viewed on a video monitor. Next, each imager is repositioned on its respective prism exit port until each color raster spatially coincides with each other raster to within an acceptable tolerance, such that the image is correctly reproduced in full color. Finally, the imagers adhesives are exposed to UV light for curing the adhesive and fixing the imagers relative position on the prism. This alignment technique requires that temporary electrical connections be made to operate each of the imagers. This is undesirable since the operating levels for each imager may be different due to process variations. Consequently, this alignment technique is time consuming and requires a skilled operator, both of which increase the manufacturing cost of the completed camera.

In my copending U.S. patent application (RCA) 81,218 entitled SOLID-STATE IMAGER CHIP MOUNTING, filed on even date herewith and assigned, like the present application to RCA Corporation, I describe an imager mounting arrangement wherein unpackaged imager chips are directly bonded to respective exit ports of a prism. In a preferred embodiment, the photosensitive side of thinned substrate imager chips (i.e. imager chips wherein the substrate has been chemically etched to thin it to e.g. 8-10 micrometers) are bonded to the light exit ports of the prism. Bonding wires connect the chips bonding pads to a metallized conductor pattern on the prism exit face for providing electrical connections to the chip. Since bonding wires are fragile, it is desirable to fix the relative position of the imager chip on the prism exit port before the bonding wires are in place. Thus the temporary electrical connections for alignment are undesirable. Accordingly, there is a need for imager registration to be carried out without electrical operation of the imager chip.

SUMMARY OF THE INVENTION

The present inventor has recognized that when mounting a plurality of solid-state imagers of the type having a thinned substrate, at the exit ports of a light splitting optical assembly, such as a prism, registration of the imagers can be carried out optically if relatively light opaque alignment indicia (patterns) are formed e.g., by deposition, at predetermined positions on the surface of the imager opposite the photosensitive side (i.e, the backside of each imager). The imagers can be positioned with the photosensitive sides facing the prism exit ports and held there with an un-cured adhesive. A light can be used to illuminate the backside of each chip such that the alignment indicia of each chip are visible at the light input port of the prism. Then, each imager can be repositioned until the alignment indicia for each chip coincide with each other when viewed at the prism input port. When so aligned, the photosensitive imaging areas of each chip will be precisely registered with each other. Finally, the position of the imagers are fixed by curing of the adhesive. Preferrably, the alignment indicia are located behind the imaging area on the backside of the imager.

DETAILED DESCRIPTION OF THE INVENTION

Figure 1:
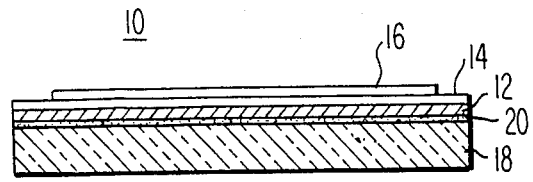
FIG. 1 illustrates a section view of a thinned substrate solid-state imager chip.

In FIG. 1 a solid-state imager chip 10 having a thinned substrate 12 is illustrated. Fabrication of such chips begins with the selective doping in and the depositing of an electrode structure 14 (comprising e.g. polysilicon) on what is conventionally called the gate or front side of a relatively thick (e.g. approximately 12 to 15 mils) semiconductor wafer for forming a plurality of solid-state imagers. An aluminum layer 16 is deposited over electrode structure 14, from which signal busses and bonding pads are formed by selective etching. Each imager may be e.g., of the well-known frame transfer CCD type. The gate side and the peripheral edge of the side of the wafer opposite the gate side (i.e. the backside) is protected by a coating and the wafer is then placed in a chemical bath which thins the entire center region of the backside of the wafer to approximately 8-10 microns. For providing structural integrity to the wafer, a sheet of relative thick e.g., 10-12 millimeters of light transmissive material 18, such as glass, is normally attached to the backside the thinned wafer using an optical quality light transmissive adhesive 20 uniformly distributed between glass 18 and substrate 12. The wafer is then cut up by a process called "dicing" for separating the plurality of imagers into individual imager chips. The electronic devices formed in the imager chips by these conventional techniques create photosensitive picture elements (pixels). With a thinned substrate imager, light is directed at the pixels from the thinned substrate side, i.e., through glass 18. Light striking substrate side, i.e., through glass 18. Light striking substrate 12 develops free electrons which are collected in the potential wells formed beneath electrode structure 14 in substrate 12 for developing charges in the pixels which are representative of the light imaged thereon. These charges are subsequentially read-out of the pixels for developing electrical signals representative of the image. Details of a method for the manufacture of such thinned substrate imager chips is disclosed in U.S. Pat. No. 4,266,334 entitled MANUFACTURE OF THINNED SUBSTRATE IMAGERS issued May 12, 1981 to Edwards and Pennypacker and assigned, like the present application, to RCA Corporation.

Figure 2A:
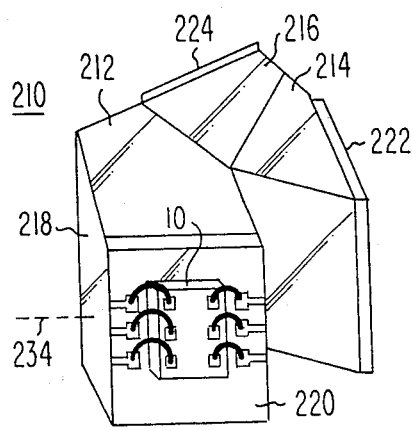
FIGS. 2a, 2b and 2c illustrate the mounting of thinned substrate solid-state imager chips at the exit ports of a color light-splitting prism.
Figure 2B:
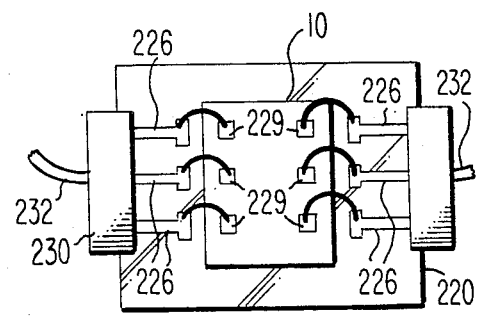
Figure 2C:
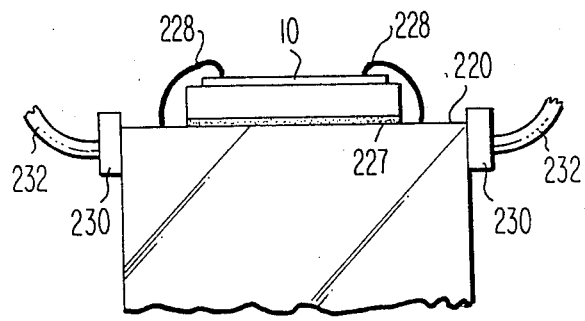

FIGS. 2a, 2b and 2c illustrate the mounting of thinned substrate imager chips in accordance with my previously noted copending U.S. patent application. Briefly, in FIG. 2a, a color light-splitting prism 210 formed from three optically transmissive prism sections 212, 214, and 216 are separated by dichroic surfaces, as known in the art, for dividing light directed at an input port 218 into its red, green and blue components at exit ports 220, 222, and 224, respectively. The glass side 18 of solid-state imager chip 10 (of FIG. 1) is directly attached to prism 210 in a fixed position at each of its exit ports 220, 222, and 224 for providing red, green and blue color component electrical signal representative of the light from an image directed at input port 218. The mounting of imager chip 10 to red exit port 220 is shown in detail in FIGS. 2b and 2c.

As shown in FIGS. 2b and 2c, prism exit port 220 includes a metallized pattern of conductors 226 extending from the periphery of prism exit port 220 towards the area where imager chip 10 is to be attached. During manufacture of an integral imager chip/prism assembly, an optical quality adhesive is uniformly applied to glass 18 of imager chip 10 which is then positioned on the surface of exit port 220 such that the center of the photosensitive imaging area of chip 10 is aligned with optical axis 234 of the prism at exit port 220. For providing electrical connection to imager chip 10, bonding wires 228 are bonded between bonding pads 229 on the gate side of the imager chip and metallized conductors 226. Conventional external imager drive pulse and video signal processing circuitry (not shown) are coupled to conductors 226 by connectors 230, which are bonded to the edge of prism exit port 220. Connectors 230 include pins (not shown) which at one end are soldered to conductors 226 and which mate at the other end with other pins which are connected to electrical cables 232 leading to the external circuitry. The mounting of imager chips to exit ports 222 and 224 is not shown, but is substantially the same as the mounting of imager chip 10 to exit port 218.

The direct mounting of the photosensitive side of imager chips to the prism is advantageous over the mounting to the prism of packaged imager chips, since there is no air space in front of the chip's photosensitive surface (as is the case with an IC package) in which dirt or flakes of adhesive may fall or in which condensation may form. Flakes or condensation degrades the performance of the imager. Also, the imager chip can be more securely attached to the prism, improving its structural integrity and thermal stability, both of which are important requirements for imagers used in, e.g. a portable video camera. It is undesirable to perform alignment or registration of these thinned substrate imager chips on the prism in accordance with the previously noted prior art method wherein the chip is electrically operated, since the bonding wires are relatively fragile and repositioning of the chip during alignment may cause wires 228 to break or become separated from pads 229 or conductors 226.

It has been recognized by the present inventor that the alignment or registration of a plurality of thinned-substrate imager chips mounted at the exit ports of a light-splitting prism 210, can be accomplished optically, when alignment indicia such as a pattern of metallized lines are deposited at predetermined locations over the electrode structure on the gate side of each of the imagers. These alignment indicia may be, for example, chemically etched by conventional photolithographic processes from aluminum layer 16 used for forming bonding pads 229 on each chip 10. In this case, each chip would have the alignment indicia at precisely the same locations behind the photosensitive imaging area of each chip. Due to the thinness of the substrate of thinned substrate imager chip 10, when the chip is illuminated by light from its gate side, the light passes through the chip and the alignment pattern is transmitted through prism 210 from its exit port and is visible at its input port 218. This transmission of the alignment pattern through the prism is advantageously used for registering the chips on the prism. It should be noted that it there were no alignment pattern, it would be extremely difficult to use the polysilicon gate structure and the doped regions for horizontal and vertical alignment purpoes, since they are of relatively low contrast and difficult to observe. Additionally, due to the repetitiveness of the image structure, it would be difficult to either manually or automatically determined a particular imager location for alignment purposes.

Figure 3:
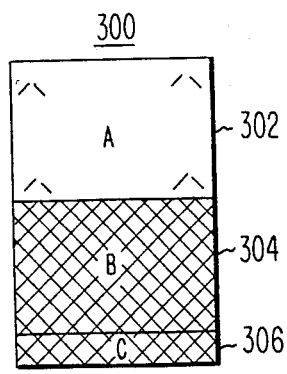
FIG. 3 illustrates in block diagram form a frame-transfer CCD imager including one type of alignment indicia in accordance with the invention, useful for optically registering the imager chips illustrated in FIG. 2.

FIG. 3 illustrates a frame transfer CCD imager 300, corresponding to imager 10 of FIG. 1, well known to those skilled in the art, including a photosensitive imaging area 302 called the A register, a field storage area 304 called the B register and a line-sequential read-out register 306 called the C register. Briefly, a light blocking mask, indicated by the cross-hatch shading, blocks B and C registers 304 and 306 from light so that only A register 302 develops a field of charges representative of the image. At the end of an image integration interval, such as 1/60 of a second, the chargers developed in A register 302 are transferred to B register 304 so that A register 302 can integrate the next field of charges during the next 1/60 of a second interval. While the next field of charges are being integrated in A register 302, C register 306 sequentially reads-out each line of charges from the prior field which is shifted down one line at a time from B register 304.

In a preferred embodiment of the present invention, the alignment indicia may comprise a pattern of chevrons (a pair of diagonal marks extending at an angle towards each other), which pattern is deposited over the electrode structure of A regsiter 302, as indicated in FIG. 3. This results in a unique spatial position between the pattern and the pixels (i.e., electrode structure) of the imaging area which position is precisely controlled for each chip. Note, that since the B and C registers already have a light blocking mask over their electrode structure, it would not be possible to include the alignment indicia in these areas. Furthermore, if the alignment indicia were not located over imaging areas 302, they may be displaced so far from the optical axis of the prism exit port that they would be outside its field. The indicia do not interfere with the electrical operation of the imager due to an oxide layer that electrically insulates them from the electrode structure, nor do they interfere with the imager optically since they are not on the photosensitive imaging side of the chip. During assembly, an optical quality ultraviolet light (UV) curable adhesive 227 (as is shown in FIG. 2c) is uniformly spread between prism exit port 220 and the photosensitive side of imager chip 10 so that imager chip 10 can be positioned on the prism exit port and moved, e.g., by micromanipulators (not shown) until its photosensitive imaging area, A register 302, is aligned with optical axis 234 of prism 210. Next, the adhesive is exposed to UV light for curing it and therefore fixing the relative position between A register 302 and the prism exit port. One type of suitable UV curable optical quality adhesive is NOA-60, available from Norland Products Inc., North Brunswick, NJ. Although a UV curable adhesive is described, a thermally curable optical quality adhesive could also be used.

During the assembly of imager chips to the green and blue prism exit ports 222 and 224, after the imager chips are adhered to the respective prism surface but before the adhesive is UV cured, each of these imager chips is illuminated from the gate side while the previously mounted imager chip is simultaneously illuminated. The green and blue imager chips are re-positioned, e.g., by additional micro-manipulators while viewing their alignment patterns at prism input port 218, to bring the alignment pattern of these imager chips into precise registration with the alignment pattern of the red imager chip also visible at input port 218. Due to the identical location of the alignment pattern with the electrode structure of each chip, registration of the alignment patterns results in registration of the pixels in the imaging areas of each of the mounted chips. Once the alignment patterns of the blue and green imager chips are precisely registered, the adhesive is cured by exposure to UV light, so as to fix the position of each of the imager chips on its respective prism exit port.

Figure 4:
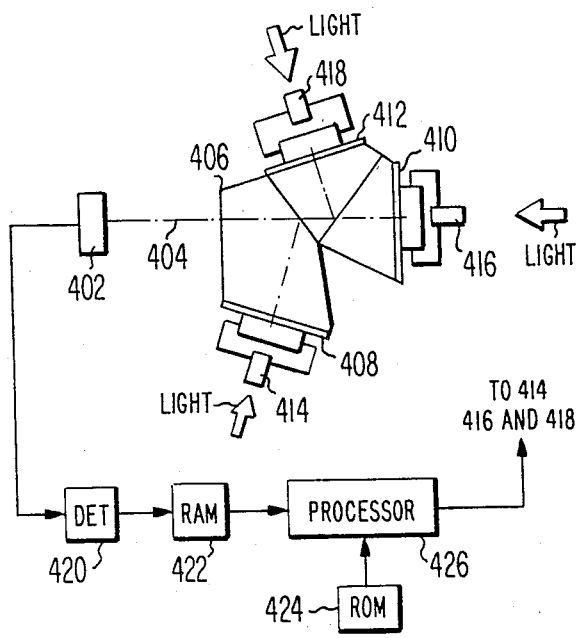
FIG. 4 illustrates in block diagram form apparatus for performing optical registration automatically.

Registration can be accomplished manually by an operator viewing (e.g., through a magnifying lens) the chip alignment patterns projected from input port 218 onto, e.g., a screen (not shown). FIG. 4 illustrates in block diagram form an apparatus for performing optical registration automatically. A sensor 402, such as a video camera, is aligned with the optical axis 404 of a prism 406. During assembly, uncured adhesive is uniformly applied to the photosensitive side of each imager chip to be mounted on prism 406 and is held at respective ones of prism exit ports 408, 410 and 412 by electronically controlled micromanipulators 414, 416 and 418. Next, a light is used to illuminate one of the imagers, such that its alignment pattern is imaged onto sensor 402. A registration detector 420 and a random access memory (RAM) 422 are used to detect and then store data indicating the position of the chevrons of the alignment pattern projected from the input port of prism 406 onto sensor 402. A read only memory (ROM) 424 has permanently stored therein data which indicates the location of the alignment chevrons for perfect registration with optical axis 404. A processor 426 compares the data stored in RAM 422 with the data stored in ROM 424 and generates correction signals based upon this comparison. The correction signals are applied to electronically control the relative movement of micromanipulators 414, 416 and 418 such that each imager chip is moved to a position which results in its pixels being in substantially perfect registration with the pixels of the other imagers and with optical axis 404. Alternately, data indicating the positions of the alignment chevrons for each imager can be stored and processor 426 can generate control signals for moving the three imagers with respect to each other until the stored data indicates the chips are in alignment. Furthermore, since alignment with optical axis 404 is not as critical as chip-to-chip registration requirements, a first of the imager chips can be manually positioned relative to optical axis 404 and the remaining imager chips can be precisely registered with the first chip by the above-noted automatic means. Circuits of the type shown in FIG. 4 are similar to those for performing automatic registration of cameras including pick-up tubes and are well known to those familiar with automatic registration. For example, a system including a memory for storing data detected from a sensor viewing a setup chart including chevrons is described in detail in U.S. Pat. No. 4,215,368 entitled MEMORY ADDRESSING SYSTEM FOR AUTOMATIC SET-UP TV CAMERA SYSTEM, issued July 29, 1980 to Flory et al and a processor for generating correction signals in response to detected error signals may be of the type disclosed in U.S. Pat. No. 4,133,033 entitled RASTER REGISTRATION SYSTEM FOR A TELEVISION CAMERA, issued Jan. 2, 1979 to FLory et al.

As previously noted, imager chip alignment according to the invention is accomplished without activating the photosensitive pixels on the imager. Thus, imager registration is optically perfect. This may not be possible with prior art assemblies having imagers aligned by electrical registration of the image representative signals from the individual imager chips since, when the imagers are electrically aligned, their photosensitive locations are partially dependent upon the amplitude of the driving pulses applied to the electrode structure. Thus, when a plurality of imager chips are electronically registered on, e.g., a prism, their registration is dependent upon the level of the imager operating signals applied during manufacture, which may be different from and therefore require re-adjustment of the operating signal levels set during the assembly of a video camera. As previously noted, electronic registration is rather complicated and requires a skilled operator for setting up the proper operating level of the imagers drive signals. On the other hand, optical registration can be more easily performed by automatic means, such as illustrated by FIG. 4, thereby reducing manufacturing costs. Additionally, optical registration can be performed before the imager chips are electrically connected, further simplifying the manufacturing process of an integral imager chip/prism assembly and reducing the possibility of breaking the fragile bonding wires during registration.

Figure 5:
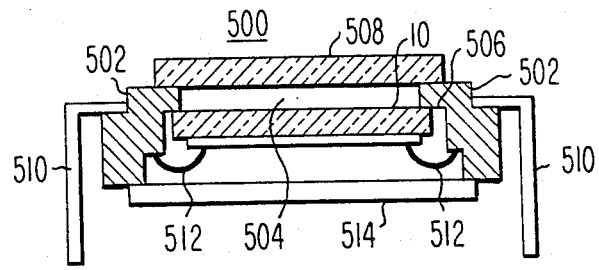
FIG. 5 illustrates a thinned substrate imager chip in an integrated circuit package.
Figure 6:
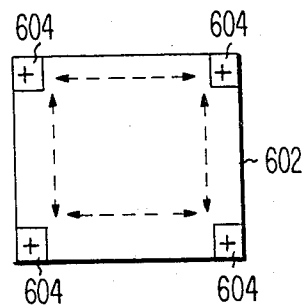
FIG. 6 illustrates one type of alignment indicia and their location on an imager chip.

Although alignment in accordance with the present invention has been described using unpackaged imager chips, it should be clear to those skilled in the art that the disclosed imager alignment method could also be used with packaged imagers. FIG. 5 illustrates the conventional packaging for a thinned substrate imager in an integrated circuit package 500. Package 500 includes an electrically insulating ceramic chip carrier 502 having an opening 504 and an interior shoulder portion 506 aligned with opening 504. Shoulder portion 506 supports a thinned substrated imager chip 10 such that the light entering opening 504 falls on the photosensitive substrate side of imager chip 10. The peripheries of the photosensitive side of chip 10 are epoxied to shoulder portion 506 for securing chip 10 within package 500. A light transmissive window 508 is epoxied at its periphery to the carrier portion opposite shoulder 506, for protecting imager 10 from dirt and other contaminants while allowing light passage to imager chip 10. Electrical connection of external drive and signal processing circuitry (not shown) to imager chip 10 is made by connector pins 510 which are electrically connected to bonding wires 512 by a metallized pattern (not shown) within carrier 502. An opaque lid 514 completes IC package 500 and is epoxied to the side of carrier 502 which is opposite window 508, for hermetically sealing and preventing extraneous light from entering IC package 500. Optical alignment in accordance with the present invention could be carried out with plurality packaged imager chips if each have an identical alignment pattern deposited thereon in substantially the same manner as previously described, except that opaque lid 514 would necessarily be removed during the alignment procedure. In the alternative, lid 514 could be light transmissive in the area covering the chips alignment indicia. Additionally, it should be noted that the word "light" used herein is intended to include non-visible light, such as infrared and ultraviolet, as well as visible light. Furthermore, it should be clear that alignment indicia other than chevrons could be used and could be positioned elsewhere on the chip for performing optical alignment in accordance with the invention. For example, the alignment indicia may take the shape of orthogonally crossed pairs of lines (i.e., +) since their intersection point is relatively stable irrespective of chemical etching variations. Consequently, as shown in FIG. 6, the indicia can be located over predetermined pixels 604 within the iamging area 602 of each chip, for precisely registering each chip to within a small fraction of a pixel width. The remainder of the pixels within imaging area 602 are not shown. Alternatively the indicia can be located outside the imaging area 602 of the chip. Finally, it is not necessary that the alignment patterns on each chip be located in exactly the same position, since known differences in position of the alignment pattern can be taken into account by pre-programming of the automatic alignment apparatus.

What is claimed is:

1. A method for registering the pixels of the photosensitive imaging areas of at least two solid-state imager chips at first and second light exit ports of a light-splitting optical assembly having a common light input port, said solid-state imager chips having substrates thin enough to allow light to pass therethrough, said method comprising the following steps in the order named:
    placing light blocking alignment indicia at predetermined positions relative to the imaging area on the side of each imager chip which is opposite said imaging area;
    positioning said first and second imager chips at said first and second exit ports, respectively, such that their imaging areas each face their respective exit port;
    illuminating with light the side of said first and second imager chips which include said alignment indicia;
    viewing the illuminated alignment indicia of said first and second imager chips as they are transmitted by said optical assembly from its exit ports to its common input port;
    re-positioning said first and second imagers at their respective exit ports in response to the viewing of the prior step, so as to register the alignment patterns viewed from each chip, and thus the pixels of each chip with each other chip; and
    fixedly attaching each imager to its respective exit port.

2. The method of claim 1 wherein said placing step comprises depositing said alignment indicia over predetermined identical positions on the side of each imager chip which is opposite the photosensitive area.

3. The method of claim 2 where said identical positions are located over predetermined pixels of the photosensitive imaging areas of each chip.

4. The method of claim 3 wherein each of said alignment indicia comprise a pair of orthogonally crossed lines, each intersection of said lines being located over a different one of said predetermined pixels.

5. The method of claim 1 wherein said positioning step includes the application of an un-cured adhesive between each exit port and its respective imager chip.

6. The method of claim 5 wherein said positioning step comprises direct attachment of the photosensitive imaging side of said imager chip to its respective exit port using said adhesive.

7. The method of claim 5 wherein said fixedly attaching step comprises curing of said adhesive.

8. The method of claim 1 wherein said illuminating step comprises simultaneous illumination of said first and second imager chips.

9. The method of claim 1 wherein said viewing step includes viewing said alignment indicia with a photosensitive sensor.

10. The method of claim 9 wherein said re-positioning step includes comparing circuitry for comparing signals supplied from said sensor during said viewing step with stored data signals for developing control signals which are applied to re-position said imager chips.

11. A method for registering the photosensitive imaging area of at least two thinned substrate solid-state imager chips at first and second light exit ports of a light-splitting prism having a common light input port, said method comprising the following sequential steps:
    placing light blocking alignment indicia at predetermined positions relative to the imaging area on the side of each imager chip which is opposite said imaging area;
    positioning a first of said imager chips at said first prism exit port;
    illuminating said first imager chip from the side including the alignment indicia;
    viewing the alignment indicia of said first imager chip from said input port of said prism and re-positioning said first imager chip to a desired location on said first exit port;
    fixedly attaching said first imager chip in said desired position;
    positioning the second of said imager chips at said second prism exit port;

illuminating the side of said first and second imager chips including said alignment indicia;

viewing the alignment indicia of said first and second imager chips from the input port of said prism and re-positioning said second imager chip such that its alignment indicia are registered with the alignment indicia of said first imager chip; and fixedly attaching said second imager chip to said second exit port.

12. The method of claim 11 wherein said positioning step includes the application of an un-cured adhesive between each prism exit port and its respective imager chip.

13. The method of claim 12 wherein said fixedly attaching steps comprises curing said un-cured adhesive.

14. The method of claim 13 wherein said second-mentioned illuminating step comprises simultaneous illumination of said imager chips.

15. A solid-state imager comprising:
    a thinned semiconductor substrate having selective doping therein and an electrode structure thereon for defining a photosensitive imaging area on one side thereof; and
    a light-blocking alignment pattern on a side of said substrate opposite said one side and located within the boundries of said photosensitive imaging area.

16. The imager of claim 15 wherein said alignment pattern is photolithographically deposited on said opposite side of said substrate.

17. A method for registering the pixels of the photosensitive imaging areas of at least two solid-state imager chips at first and second light exit ports of a light-splitting optical assembly having a common light input port, said method comprising the following steps in the order named:

placing light blocking alignment indicia at predetermined positions on a side of each imager chip;

positioning said first and second imager chips at said first and second exit ports, respectively, such that their imaging areas each face their respective exit port;

illuminating with light the side of said first and second imager chips which include said alignment indicia;

viewing the illuminated alignment indicia of said first and second imager chips as they are transmitted by said optical assembly from its exit ports to its common input port;

re-positioning said first and second imagers at their respective exit ports in response to the viewing of the prior step, so as to register the alignment patterns viewed from each chip, and thus the pixels of each chip with each other chip; and fixedly attaching each imager to its respective exit port.

18. The method of claim 17 wherein said placing step comprise depositing said alignment indicia over predetermined identical positions on the side of each imager chip which is opposite the photosensitive area.

19. The method of claim 18 wherein said identical positions are located over predetermined pixels of the photosensitive imaging areas of each chip.

* * * * *